United States Patent
Hirota et al.

[11] 4,295,171
[45] Oct. 13, 1981

[54] SYSTEM FOR CONTROLLING ROTATION OF ROTATING STRUCTURE

[75] Inventors: Akira Hirota, Chigasaki; Yoshiteru Kosaka, Kamakura; Kazutaka Ashida, Sagamihara, all of Japan

[73] Assignee: Victor Company of Japan, Ltd., Yokohama, Japan

[21] Appl. No.: 120,287

[22] Filed: Feb. 11, 1980

[30] Foreign Application Priority Data

Feb. 13, 1979 [JP] Japan .................. 54-15226

[51] Int. Cl.³ ................ G11B 15/54; G11B 19/28
[52] U.S. Cl. ................ 360/73; 318/603
[58] Field of Search .......... 360/71, 72.3, 73; 318/7, 603; 242/186

[56] References Cited

U.S. PATENT DOCUMENTS

| | | | |
|---|---|---|---|
| 4,146,910 | 3/1979 | Oliver et al. | 360/73 |
| 4,157,488 | 6/1979 | Allan | 360/73 |
| 4,190,860 | 2/1980 | Somers et al. | 360/73 |
| 4,217,612 | 8/1980 | Matla et al. | 360/77 |

Primary Examiner—Stuart N. Hecker
Attorney, Agent, or Firm—Haseltine & Lake

[57] ABSTRACT

A system for controlling the rotation of a rotating structure comprises a detector for detecting the rotation of the rotating structure a circuit for repeatedly forming address signals for every revolution of the rotating structure in response to a detection output from the rotation detector, a memory circuit in which control data responsive to deviations in the rotational peripheral speed of the rotating structure in each revolution thereof have been stored beforehand at addresses corresponding to the address signals, the address signals being supplied to the memory circuit, whereupon the data stored at the corresponding addresses are read out, and a control circuit for obtaining a control signal from the detection output of the rotation detector and the data thus read out from the memory circuit and accordingly controlling the rotation of the rotating structure.

6 Claims, 6 Drawing Figures

SYSTEM FOR CONTROLLING ROTATION OF ROTATING STRUCTURE

BACKGROUND OF THE INVENTION

The present invention relates generally to systems for controlling rotation of rotating structures and more particularly to a system for carrying out control so that the circumferential speed in rotation of a rotating structure such as a capstan of an apparatus such as, for example, a tape recorder or a video tape recorder will be constant.

As a system for controlling the rotation of a capstan for driving a magnetic tape and causing it to travel in a magnetic recording and/or reproducing apparatus such as, for example, a tape recorder or a video tape recorder, a system of the following description has generally been used in the prior art. This known system comprises a rotation pulse generator comprising a gear made of magnetic material and provided on the rotor shaft of a capstan motor for rotating the capstan and a detection head provided to face the peripheral surface of this gear and a control circuit for causing the generation of a trapezoidal wave in response to the rotation pulses from the pulse generator and phase comparing the trapezoidal wave with reference sampling pulses thereby to produce an output an error voltage. This output error voltage of the control circuit is applied to the capstan motor to control the same so that its rotation becomes constant.

This known system for controlling the rotational speed of a rotating structure operates merely to control the rotational speed of the capstan motor at a specific speed by averaging it over a number of revolutions so that the width of the pulses generated by the rotation pulse generator will become constant. Consequently, in the case where there is an eccentricity in the capstan, for example, in this known control system, the circumferential speed in rotation of the capstan cannot be controlled at a constant value. For this reason, control cannot be exercised to eliminate the rotational deviation in one revolution of the capstan, whereby it is not possible to attain control such that the travel of the magnetic tape will be at a precisely constant speed.

SUMMARY OF THE INVENTION

Accordingly, it is a general object of the present invention to provide a new and useful system for controlling the rotation of a rotating structure in which system the above described difficulties of the known system have been overcome.

Another and specific object of the invention is to provide a system for carrying out control of the rotation of a rotating structure so that the circumferential or peripheral speed in rotation in each revolution of the rotating structure will be constant. By the practice of the invention, control is so exercised that, even if there are irregularities such as eccentricity in the rotating structure, variations in peripheral speed of the rotating structure arising from these irregularities such as eccentricity are eliminated. As a result, the magnetic tape is driven to travel continually at a constant speed. By the practice of the invention, furthermore, since rotational irregularities in one revolution can be removed, the loop gain of the control loop can be made greater than that in a known system. In addition, there is no necessity of using a flywheel for reducing rotational irregularities, and the weight of the apparatus can be reduced.

Still another object of the invention is to provide a system which operates to cause data for canceling peripheral speed variations in each revolution of the rotating structure to be stored beforehand in a memory circuit and to control the rotation of the rotating structure while reading out the stored contents as the rotating structure rotates.

Other objects and further features of the invention will be apparent from the following detailed description when read in conjunction with the accompanying drawings.

DETAILED DESCRIPTION

Figure 1:
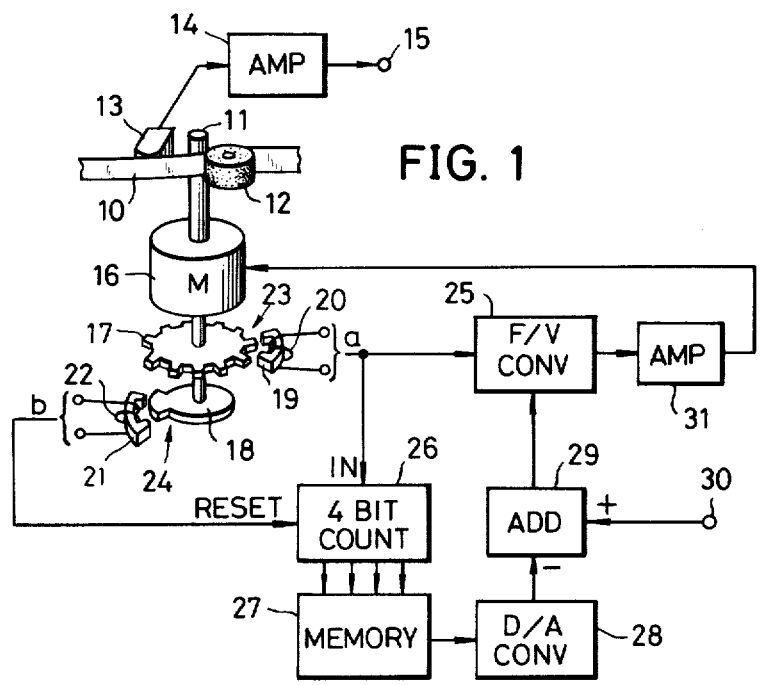
FIG. 1 is a block schematic diagram, with a portion in schematic perspective view, showing the essential organization of one embodiment of the rotation control system according to the present invention.

The system of the present invention will first be described with respect to one embodiment thereof with reference to FIG. 1. A magnetic tape 10 is clamped between and driven in tape travel by a rotating capstan 11 and a pinch roller 12. A signal recorded on this traveling tape 10 is reproduced by a reproducing head 13 and, after being amplified by an amplifier 14, is sent to a circuit described hereinafter.

The capstan 11 is driven in rotation by a capstan motor 16 having an extended rotor shaft on which are fixed discs 17 and 18 made of magnetic material. The disc 17 is provided around its outer periphery with, for example, sixteen projections in the form of teeth. In a position to face the outer periphery of this disc 17, there is fixedly disposed a detection head 19 having at its two ends confronting projections in spaced-apart positions to respectively confront two adjacent projections of the disc 17. A coil 20 is wound around a core of the detection head 19 at its middle part between its end projections. The disc 18 is provided at a position on its outer periphery with a single projection. A detection head 21 is fixedly disposed to confront the outer periphery of this disc 18. A coil 22 is wound around a core of the detection head 21, which is thus in the form of an electromagnetic core.

Figure 2:
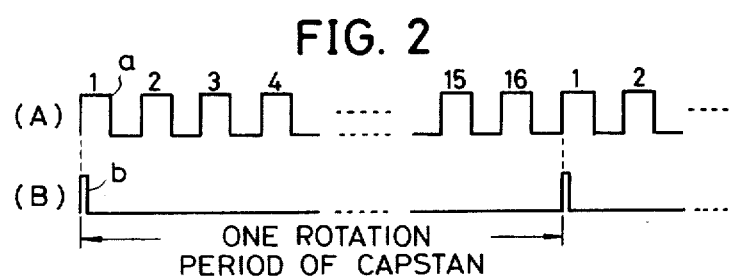
FIGS. 2(A) and 2(B) are pulse waveform charts showing output pulses of pulse generators in the system illustrated in FIG. 1.

DC currents are passed through the coils 20 and 22 during operation. As the discs 17 and 18 rotate unitarily with the capstan 11, the reluctances respectively between the cores of the detection heads 19 and 21 and the discs 17 and 18 vary. As a consequence, for every revolution of the disc 17, sixteen pulses a as indicated in FIG. 2(A) are led out from the head 19, while, for every revolution of the disc 18, a single pulse b as shown in FIG. 2(B) is led out from the head 21. The disc 17, the head 19, and the coil 20 and the disc 18, the head 21, and the coil 22 respectively constitute pulse generators 23 and 24.

In this connection, the organization of the pulse generators 23 and 24 is not necessarily limited to that in the above described embodiment of the invention. For example, it may be in a form employing discs provided with magnets used instead of the discs 17 and 18 having peripheral projections and employing Hall elements instead of the heads 19 and 21.

The pulses a from the pulse generator 23 are supplied to a frequency/voltage (F/V) converter 25 and to an input terminal of a 4-bit counter 26. The pulse b from the pulse generator 24 is supplied to a reset terminal of the 4-bit counter 26. The 4-bit counter operates in response to the first, second, . . . sixteenth pulses a to produce as output a digital signal indicating an address number represented by binary number and supplies this digital signal as an address signal to a memory circuit 27. In this case, the 4-bit counter is reset by a pulse b for every sixteen pulse signals a. For this reason, the above mentioned output address signal is a repeated signal designating the first, second, . . . sixteenth addresses.

For the memory circuit 27, a memory circuit such as a fuse ROM having a digital data storing section capable of writing in sixteen bits, for example, is used. The memory circuit 27 has, stored therein beforehand as described hereinafter, data for correcting deviations in the speed of the magnetic tape 10 during one revolution of the capstan 11 in response to these deviations, in which data error components of eccentricities and the like of parts such as the capstan 11 and the discs 17 and 18 have all been anticipated and allowed for.

In the memory circuit 27, the stored contents of the addresses designated in response to the address signals from the 4-bit counter 26 are read out and fed to a digital-analog (D/A) converter 28. As a consequence, sixteen digital data are repeatedly fed every revolution of the capstan 11 to the D/A converter 11. The output analog signal of the D/A converter 28 is supplied with a minus (negative) sign to an adder 29, where it is added to a reference voltage supplied with a plus (positive) sign from a terminal 30. The resulting output of the adder 29 is applied as a correction voltage to the above mentioned F/V converter 25, and the F/V conversion characteristic is varied. The output voltage of the F/V converter 25 is applied by way of an amplifier 31 to the aforementioned capstan motor 16 to control the rotation of the motor 16 during each revolution thereof. As a result, the rotation of the capstan 16 is finely controlled during each revolution thereof in a manner such that, even when there are irregularities such as eccentricity in parts such as the capstan 11, the magnetic tape travels continually at a constant speed.

Figure 3:
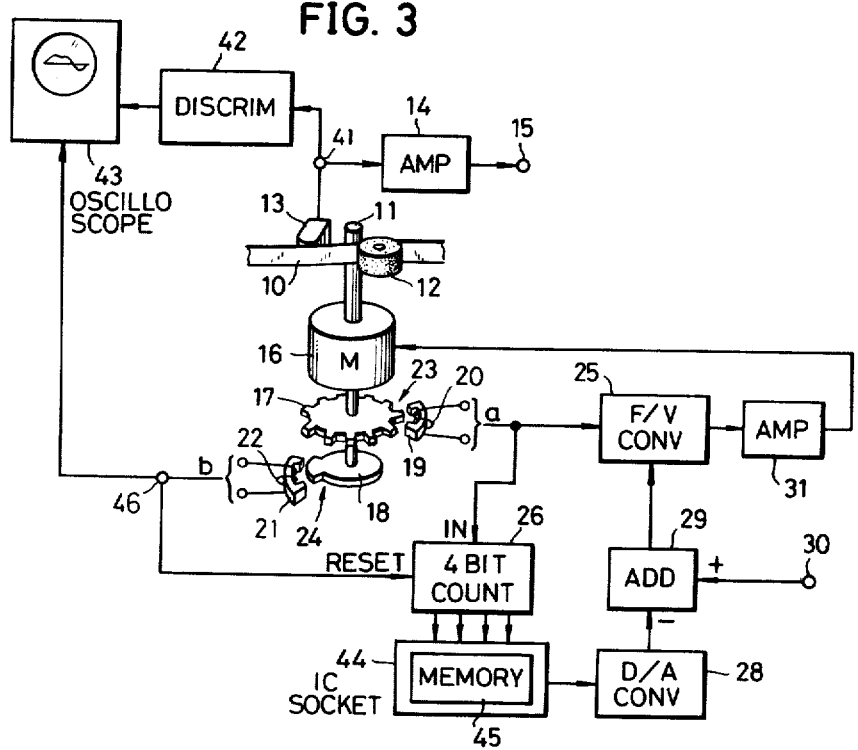
FIG. 3 is a block schematic diagram, with a portion in schematic perspective view, for a description of the operation of writing into a memory circuit used in the system of the invention.

Next, the operation of the storing (writing) of the control data into the memory circuit 27 used in the above described control will be described in conjunction with FIG. 3. In FIG. 3, those parts which are the same as corresponding parts in FIG. 1 are designated by like reference numeral. Description of such parts will not be repeated.

Figure 4:
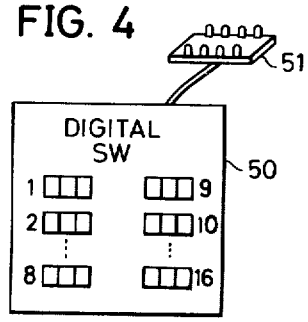
FIGS. 4 and 5 are views respectively showing a digital switch and a ROM writer used for the operation of writing into the memory circuit.

First, a discriminator 42 is connected to a test point 41 on the output line of the reproducing head 13, and an external trigger input terminal of an oscilloscope 43 is connected to a test point 46 on the output line of the pulse generator 24. The plug 51 of a digital switch 50 shown in FIG. 4 is inserted into an IC socket 44 connected to the 4-bit counter 26. The IC socket 44 is of shape such that the pins of a memory 45 are inserted thereinto, and the memory 45 is disconnected during the above mentioned operation. The plug 51 has pins of the configurations of the pins of an IC.

It is to be noted that the deviations in the travel speed of the magnetic tape arising from causes such as eccentricity of the capstan 11 are uniquely characteristic of respective magnetic recording/reproducing apparatuses, and once the control data are stored in the memory 45, there is no necessity of changing the stored content. In the present embodiment of the invention the fuse ROM is used for the memory 45.

For the magnetic tape 10, a standard tape on which a signal of a specific frequency (for example, of 3 KHz) has been recorded is used, and this signal is reproduced by the reproducing head 13. The reproduced signal is frequency discriminated by the discriminator 42, and a voltage responsively varying with the frequency fluctuation is fed to the oscilloscope 43.

Figure 6:
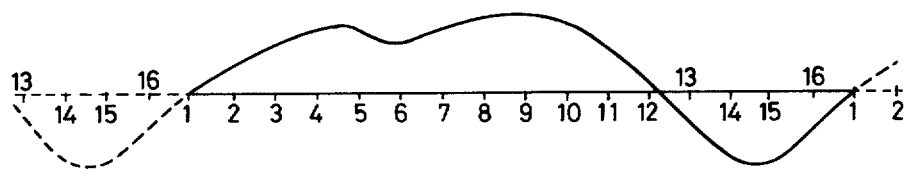
FIG. 6 is a waveform pattern shown on the screen of an oscilloscope in the system shown in FIG. 3.

Then, when there is an eccentricity in parts such as the capstan 11, the peripheral speed of the capstan 11 is not constant, whereby a deviation develops in the traveling speed of the magnetic tape 10. Consequently, the voltage supplied from the discriminator 42 to the oscilloscope 43 also fluctuates, and a waveform as indicated in FIG. 6, for example, is projected on the screen of the oscilloscope 43. Since a single pulse b is supplied once every revolution of the capstan 11 from the pulse generator 24 to the oscilloscope 43, the waveform, such as that in FIG. 6, is repeatedly formed every revolution of the capstan 11.

The horizontal axis or abscissa of the image screen of the oscilloscope 43 is provided with sixteen equally-spaced calibration marks of numbers "1" through "16". The switches of numbers "1" through "16", in the digital switch 50 are manipulatively operated in accordance with the magnitude of deviation of the waveform for every mark number from the standard or datum line, and adjusting is thus carried out to bring the waveform into coincidence with the horizontal standard line.

In the case where the waveform on the oscilloscope continually fluctuates and is not easily observable because of some external disturbances not arising from eccentricity of the capstan 11, the image screen of the oscilloscope is photographed with a photographic camera with a shutter opened for about 60 seconds, for example. When the film thus exposed is developed, a waveform pattern due to the fluctuation which always occurs every revolution of the capstan 11 appears as a bright portion, whereas a waveform due to a sudden fluctuation appears relatively dark. Accordingly, on the basis of the waveform which appears bright, the digital switch 50 is manipulated and adjusted so as to correct the waveform.

Figure 5:
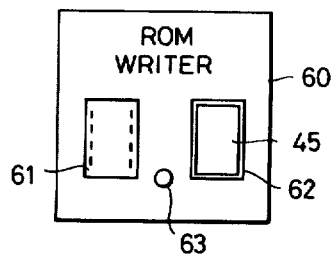

The plug 51 is thereafter extracted from the socket 44 and inserted into a socket 61 of a ROM writer 60 as shown in FIG. 5. A memory 45 into which storing is to be carried out is plugged into a socket 62 of the ROM writer 60. A writing starting button 63 of the ROM writer 60 is then pushed, whereupon the contents stored in the switches of numbers "1" to "16" of the digital switch 50 are written (stored) in the addresses of the same numbers as the switch numbers of the memory 45. The writing operation is thus completed. The memory 45 into which the data of the digital switch 50 have been transferred in this manner is disconnected from the ROM writer 60 and inserted into the socket 44. The discriminator 42 and the oscilloscope 43 are disconnected from the test points 41 and 46, and the assembly of the magnetic recording/reproducing apparatus is completed.

Since deviations in the traveling speed of the magnetic tape arising from causes such as an eccentricity of the capstan 11 are uniquely characteristic of individual magnetic recording/reproducing apparatuses, the above described operation of writing data into the memory 45 is carried out for each recording/reproducing apparatus.

The magnetic recording/reproducing apparatus may be one for recording and reproducing audio signals or one for recording and reproducing video signals. Furthermore, the system of the present invention is applicable also to the control of the rotation of the turntable in an apparatus for recording and reproducing record discs.

Instead of the 4-bit counter 26, the memory circuit 27, the D/A converter 28, and the F/V converter 25, a microcomputer capable of carrying out the operations of these components may be used. Furthermore, a microcomputer capable of performing functions such as the observation by the oscilloscope 43, the setting by the digital switch 50, and the writing by the ROM writer 60 may be employed in place of these components.

By the use of the rotation control system of the present invention as described above, irregularities in the peripheral speed of a rotating structure such as a capstan during each revolution thereof can be eliminated. Furthermore, stabilization of rotation can be accomplished through a large loop gain of the control system, and other irregularities in rotation can be greatly suppressed. In addition, since the degree of improvement of the control system is high, there is no necessity of relying on mechanical inertia as in the conventional use of a flywheel, and weight reduction in the entire apparatus can be achieved.

Further, this invention is not limited to these embodiments but various variations and modifications may be made without departing from the scope of the invention.

What is claimed is:

1. A system for controlling the rotation of a rotating structure comprising:
   means for detecting the rotation of the rotating structure;
   means for repeatedly forming address signals for every revolution of the rotating structure in response to a detection output from the rotation detection means;
   memory means in which control data responsive to deviations in the rotational peripheral speed of the rotating structure in each revolution thereof have been stored beforehand at addresses corresponding to said address signals, the address signals being supplied to the memory means, whereupon the data stored at the corresponding addresses are read out; and
   control means for obtaining a control signal from the detection output of the rotation detecting means and the data thus read out from the memory means and accordingly controlling the rotation of the rotating structure.

2. A rotation controlling system as claimed in claim 1 in which the rotation detecting means comprises first pulse generating means for generating a plurality of first pulses in accordance with the rotation of the rotating structure and second pulse generating means for generating a single second pulse every revolution of the rotating structure, and the address signal forming means comprises an N-bit counter (where N is an integer) which receives through an input terminal thereof the first pulses from the first pulse generating means and through a reset terminal thereof the second pulse from the second pulse generating means, and which produces as output address signals corresponding to the first pulses which are repeated every second pulse.

3. A rotation controlling system as claimed in claim 1 in which the rotation controlling means comprises a digital-to-analog converter for converting the digital quantity of the data read out from the memory means into an analog quantity, means for supplying a reference voltage, means for adding the output of the digital-to-analog converter and the reference voltage, and means for obtaining said control signal from the detection output of the rotation detection means and the output of the adding means.

4. A rotation controlling system as claimed in claim 1 in which the memory means comprises a fuse ROM.

5. A rotation controlling system as claimed in claim 1 which is used in a reproducing apparatus having a motor for rotating the rotating structure for driving a recording medium and means for reproducing signals recorded on the recording medium, and in which the memory means has stored therein data corresponding to any speed deviation detected upon reproduction of the recording medium on which a reference signal has been recorded.

6. A rotation controlling system as claimed in claim 5 in which said data have been stored in the memory means through the use of means for temporarily accumulating data responsive to the speed deviation at addresses corresponding to addresses of the memory means and the use of means for writing said accumulated data into the memory means.

* * * * *